Feb. 27, 1962   G. W. BINKLEY ET AL   3,022,824
METHOD AND COMPOSITION FOR CEMENTING WELLS
Filed Sept. 8, 1958
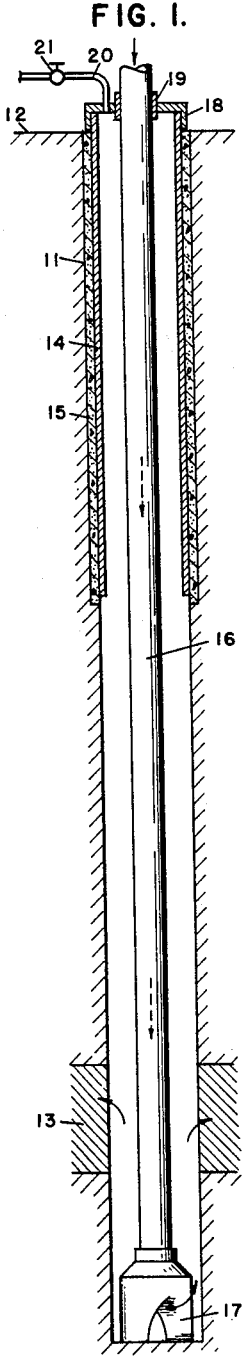
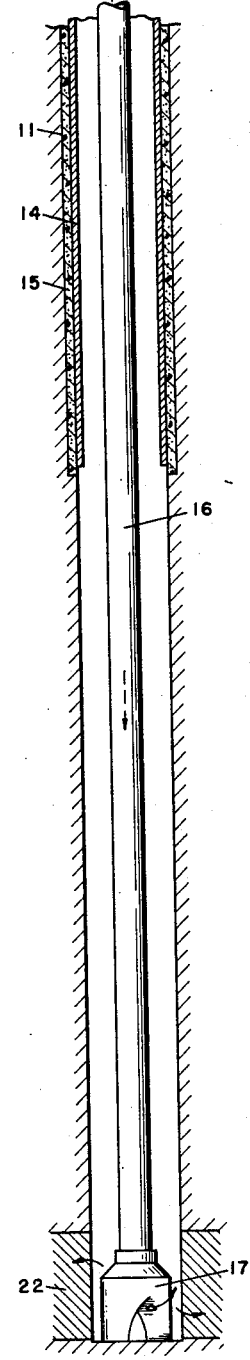
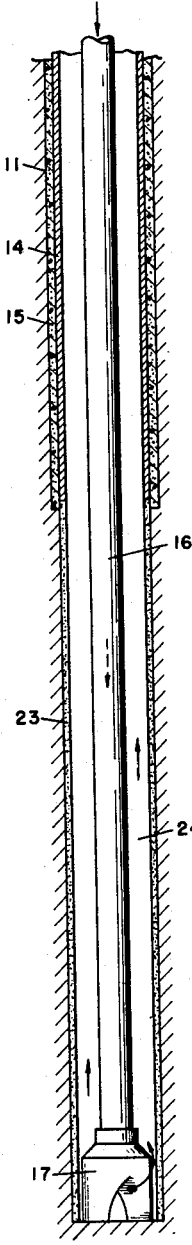
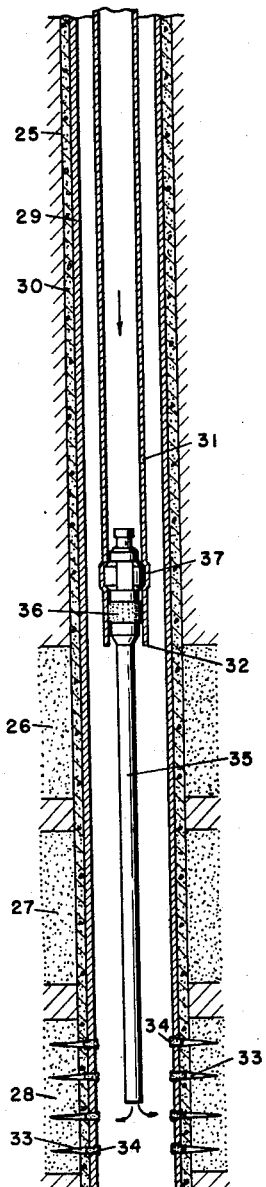
INVENTORS.
GEORGE W. BINKLEY,
LEON H. ROBINSON, JR.,
BY
ATTORNEY.

United States Patent Office 3,022,824
Patented Feb. 27, 1962

3,022,824
METHOD AND COMPOSITION FOR CEMENTING WELLS
George W. Binkley, Bellaire, and Leon Haynsworth Robinson, Jr., Houston, Tex., assignors, by mesne assignments, to Jersey Production Research Company, Tulsa, Okla., a corporation of Delaware
Filed Sept. 8, 1958, Ser. No. 759,636
10 Claims. (Cl. 166—31)

The present invention is directed to a method and composition for cementing wells. More particularly, the invention is concerned with a water resistant cement composition and a method for using same in cementing wells. In its more specific aspects, the invention is concerned with a water-resistant composition containing a hydratable cement and the use of same in well drilling operations.

The present invention may be briefly described as a water resistant composition which comprises a mixture of hydratable cement, a liquid hydrocarbon, and a sufficient amount of a salt which causes preferential wetting of the cement with the liquid hydrocarbon to render the cement water resistant.

The invention may also be briefly described as a method for cementing wells in which a water resistant composition is formed comprising a mixture of hydratable cement, a liquid hydrocarbon, and a sufficient amount of a salt which causes preferential wetting of the cement with the liquid hydrocarbon. The composition is introduced into a well and there contacted with a sufficient amount of an aqueous solution of a salt which causes wetting of the cement with the solution whereby the cement is caused to set in the well.

The salt which causes preferential wetting of the cement with the liquid hydrocarbon is one which has a hydrophile-lipophile balance in the range between about 0.0 and 8 while the salt which causes wetting of the cement with the solution has a hydrophile-lipophile balance in the range from about 13 to about 40. Hydrophile-lipophile balance (HLB) is a term recognized in the art and is described by W. C. Griffin in The Journal Society Cosmetic Chemists, vol. 5, page 249 (1954), and also in "Emulsions: Theory and Practice," Reinhold Publishing Corp., New York, 1957, at pages 189 to 196.

The present invention is concerned with hydratable cements such as Portland cement, pozzolana and lime mixtures, sand and lime mixtures, plaster of Paris, and other hydratable cementitious material and the like. The Portland cement and pozzolana and lime mixtures and sand and lime mixtures may be especially useful in deep well cementing while it is anticipated that plaster of Paris and the like may be used in shallow wells and for special jobs.

The liquid hydrocarbon employed in the practice of the present invention is suitably one having a viscosity from about 1.5 to about 400 centopoises at 60° F. and boiling in the range from about 100° to about 800° F. Illustrative of the liquid hydrocarbons may be mentioned the gasoline, kerosene, diesel oil, and gas oil hydrocarbons and the individual components thereof. Crude oils and diesel oils are used preferably. While hydrocarbon fraction obtained from crude petroleum and the like may be satisfactory, under some instances it may be desirable to employ pure hydrocarbons within the boiling range of 100° to about 800° F.

The salts employed in the practice of the present invention for preferentially wetting the cement with hydrocarbon may be illustrated by compounds such as sorbitan mono-oleate, sold under the trade name of Span 80; sorbitan sesquioleate, sold under the trade name of Arlacel C; sorbitan trioleate, known to the trade as Span 85; Coco amine acetate, sold under the trade name of Armac CD-50; diglycol laurate; diglycol oleate; Duponol G, which is fatty alcohol amine sulfate, and other compounds which have this property. As illustrations of other salts, mention may be made of compounds such as octadecyl amine, acetate, cetyl dimethyl amine acetate, Tetrosan, a cationic surface active agent sold by Onyx Oil and Chemical Co., Jersey City, N.J., the acetate of Primene JM–T, which is a mixture of primary amines with branched chains containing from 15 to 20 carbon atoms, sold by Rohm and Haas, the amine acetate prepared from Primene 81–R, which is a mixture of primary amines containing branched chains of 12 to 15 carbon atoms, sold by Rohm and Haas, alkyl tolylmethyl trimethyl ammonium chloride, alkyl dimethyl benzyl ammonium chloride, lauryl benzyl dimethyl ammonium chloride, bis quaternary salts such as reaction products of 2-octyl benzyl chloride with bis dimethyl amino butyne and nonyl benzyl chloride with bis dimethyl amino butene, di-isobutyl cresoxyethyl dimethyl benzyl ammonium chloride and di-isobutyl phenoxyethoxy ethyl dimethyl benzyl ammonium chloride, and the like. These salts have HLB values in the range from about 0 to about 8.

The salt employed in the present invention for wetting the cement with water for setting same may be illustrated by compounds such as polyoxyethylene stearate, which is sold to the trade as Myrj 52; Arquad 12, a quaternary ammonium alkyl compound; Tween 20, a polyoxyethylene sorbitan monolaurate; Brij 35, which is a polyoxyethylene stearate; Glim, which is the trade name for ethylene-oxide condensation product of an alkyl phenol; Alrose O, which is fatty alkylol amide condensation product; Alkaterge C, a substituted oxazoline; Alkanol WXM, which is a sodium alkyl aryl sulfonate; Dyensol K–50, which is sodium salt of monoamyl naphthalene. Other compounds which have HLB values in the range from about 13 to about 40 may also be used.

Generally speaking, the salt which wets the cement with oil preferentially has a low hydrophylic-lyophylic balance in the range from about 0 to about 8 to give a strongly oil wetted surface while the salt which wets the cement with water is an agent having a high hydrophylic-lyophylic balance in the range from about 13 to about 40, such as the compounds of the type illustrated.

The water resistant composition employed in the present invention may contain hydratable cement in an amount in the range from about 60% to about 99.9% by weight, liquid hydrocarbon in an amount from about 0.1 to about 40% by weight, and the low HLB salt in an amount in the range from about 0.01% to about 10%, the amounts of the liquid hydrocarbons and the low HLB salt being based on the cement. This composition is treated to cause setting of the cement with a sufficient amount of the aqueous solution of the high HLB salt such as an amount of the high HLB salt in the range from about 0.01 to about 10% by weight of the solution.

It is within the purview of the present invention to provide the water resistant composition as a slurry in the hydrocarbon containing oil up to about 40% by weight while some situations may demand and require a composition in a substantially dry condition. For example, excess oil may be removed to provide a composition containing from about 0.1% to about 10% by weight of liquid hydrocarbon and other components of the mixture. When the composition contains the lower range of liquid hydrocarbon, it may be powdered and bagged for handling like ordinary cement. Where the composition is substantially dry, excess oil is removed by filtration, centrifugation, decantation, draining, and the like.

The present invention is used advantageously in well drilling and completion operations. For example, the invention is important and useful in controlling lost circulation in a well. The invention may be used also in squeeze cementing operations where one zone is squeezed off from another zone or perforations are sealed in a casing or in a formation. The invention is useful in drilling operations employing a gasiform fluid such as air or gas. The invention is also useful and advantageous in drilling muds to plaster a filter cake on the wall of the well, following which the cement and the filter cake is set by contact with a solution containing the high HLB salt. The invention may also be used in cementing operations, for example, in a mixture with modified cements of the nature described and claimed in U.S. 2,582,459 by R. A. Salathiel; cement compositions of the Salathiel patent supra contain bentonitic clays. The present invention may also be used in modified cements such as oil-emulsion cements as described in U.S. 2,776,713 issued to Bryan E. Morgan and Charles L. Prokop. The invention is also useful in other oil-emulsion cements such as described in U.S. 2,798,003 and U.S. 2,801,931 both issued to Bryan E. Morgan and George K. Dumbauld. Other cements which may be used are described in the patent to Anderson, U.S. 2,805,719 and in the patent to Clark et al., U.S. 2,803,555. Thus, the low HLB salt and hydrocarbon, if not present in the cement composition, are suitably mixed with the compositions of the several patents mentioned supra and then used in practicing the method of the present invention.

The present invention will be further illustrated by reference to the drawing in which:

FIG. 1 is an illustration of application of the invention to drilling with a gasiform fluid;

FIG. 2 shows the use of the invention in sealing a zone of lost returns;

FIG. 3 illustrates the treatment of a filter cake containing the water resistant cement; and FIG. 4 is an embodiment where sealed perforations in a well casing are treated with a solution containing a high HLB salt.

Referring now to the drawing and praticularly to FIG. 1, numeral 11 designates a well bore drilled from the earth's surface 12 to penetrate a water invasion zone 13. Arranged in the well bore 11 is a surface casing 14 which is cemented in place with a primary cement 15. A drill string 16 extends from the earth's surface 12 and carries on its lower end a drill bit 17, which may be a rock or fishtail type bit. Drill string 16 and bit 17 provide circulation down the drill string and upwardly in the well 11.

In this particular instance, drilling has been accomplished with a gasiform fluid and the well is closed with a pressure-tight head 18 and which has a seal 19, sealing with the drill string 16. A conduit 20, controlled by a valve 21, discharges gasiform fluid from the well 11.

Assume for purposes of this description that the drill string 16 and the drill 17 have penetrated a water invasion zone 13 while drilling with gasiform fluid and water is flooding into the well and it is desired to control the water invasion. Under these circumstances, a water resistant composition such as has been described herein is introduced into the circulating gasiform fluid and is plastered on the walls of the well 11 and against the water invasion zone 13. By virtue of the water resistant composition, the cement plaster possibly containing mud from the well bore resulting from water invasion is then contacted with a solution of salt of the nature described having a high HLB supra to cause setting of the cement against the water invasion zone 13. By imposing pressure against the solution, some of the cement may be forced into the water invasion zone 13 and the zone 13 effectively sealed to prevent invasion of water into the well 11.

An advantage of cementing off water invasion zones in this manner is that there is no danger of the drill pipe being cemented in the hole inasmuch as the cement is in the form of a dry material and is plastered against the wall of the well. Also, small amounts of cement are required and there is no danger of fracturing the formation due to excessive pressures caused by pumping hydraulic fluids as is conventionally done. Furthermore, only small amounts of cement in accordance with the present invention are employed in the embodiment of FIG. 1.

Referring now to FIG. 2, a well such as 11 has a surface casing 14 cemented in place with cement 15 and is provided with a drill string such as 16 carrying a bit 17 on its lower end. In this embodiment a drilling mud containing water-resistant cement is circulated down the drill string 16 and out the bit 17 when a zone of lost circulation such as 22 is penetrated by the drill bit 17. This causes the drilling fluid containing the water resistant cement to enter the zone 22. Following the drilling fluid containing water-resistant cement down the drill string 16 and out the drill bit 17 into the zone 22 is an aqueous solution of a high HLB salt of the nature described supra which causes sealing of the zone 22 on contact with the water resistant cement composition in the drilling fluid. This mode of operation in accordance with FIG. 2 solves the lost circulation problem and avoids the employment of extra casing. Drilling operations may then be resumed and the operation repeated whenever a zone of lost circulation is encountered.

Referring now to FIG. 3, a well such as 11 provided with a surface casing 14 cemented in place with primary cement 15 has a drill string 16 carrying a bit 17 attached to its lower end. The drilling operations are conducted such as in the mode of FIG. 2 with a drilling fluid containing water-resistant cement to form on the walls of the well 11 below the surface casing 14 a filter cake 23 composed of drilling mud containing water-resistant cement. In order to form a bond, the flow of drilling mud and water-resistant cement mixture may be interrupted or terminated and an aqueous solution of a high HLB salt circulated down the drill string 16 out the drill bit 17 through the usual eyes or circulation ports and up the annulus 24 to the surface 12. This causes the cement in the filter cake to be wet with water and to set forming a firm filter cake on the walls of the well 11.

A still further mode of operation is described in FIG. 4 wherein a well such as 25 has been drilled from the earth's surface 12 to penetrate a plurality of formations, sands, horizons, intervals, strata, and the like illustrated by numerals 26, 27, and 28. Arranged in the well 25 is a casing 29 which lines the well throughout its length and is cemented in place with cement 30. Arranged in the casing 29 is a tubing string 31 positioned with its open lower end 32 immediately above the formation 26.

For purposes of this description, it may be assumed that the formation or sand 28 has been placed in communication with the interior of the casing by forming perforations 33 through the casing 29 and cement 30 and penetrating the formation 28. For purposes of description, it may also be assumed that it is desirable to cement and seal off the formation 28 and rework the well in one of the vertically spaced formations 26 or 27. To this end, there is shown in FIG. 4 the perforations 33 filled with water-resistant cement contained in a modified cement of the nature described to form nodules or buttons 34. Since these nodules or buttons of cement are water resistant, it is desirable to set them and to provide the necessary strength to form a seal.

In the showing of FIG. 4, excess water-resistant cement has been removed by circulation using a tubing extension member such as 35 which is retrievably placed in the lower end 32 of the tubing 31 in accordance with permanent well completion technique, the tubular member being sealed by sealing means 36 and supported in a landing nipple or other supporting means 37 in the lower end 32 of the tubing 31.

By virtue of the tubing extension member 35, which may have been used to place the modified cement containing water-resistant cement in the perforations 33, an aqueous solution of the high HLB salt is flowed or pumped down the tubing 31 and the tubing extension member 35 to contact the nodules or buttons 34 and to cause setting of same by virtue of the aqueous solution of high HLB salt causing the cement to be wetted by the water and to set and seal the perforations 33. In short, in the embodiment of FIG. 4 it is now possible to place a slurry containing water-resistant cement in perforations and subsequently set same by contact with a high HLB salt solution.

In further illustration of the practice of the present invention, water-resistant cements as described hereinbefore were placed in and contacted with water for periods of time up to 60 days with no evidence of setting. After these periods of time, the water-resistant cement was then contacted with water containing from 0.01% to 10% of an agent such as polyoxyethylene stearate. As a result, the cement set in the normal manner to a compressive strength of 2,000 pounds per square inch after curing seven days at room temperatures of about 72° F.

It will be seen from this operation that the cements of the present invention may be contacted with water for long periods of time without setting and then controllably set as may be desired by treament with a solution of the high HLB salt.

In the practice of the present invention, it may be desirable to employ a film-strengthening agent which may enhance the oil wetness caused by the low HLB salt. Illustrative of film-strengthening agents are calcium lignosulfonate and ferrochrome lignosulfonate and the like. Other film-strengthening agents may be illustrated by FI-con, a sulfonated phenol formaldehyde polymer described and claimed in U.S. 2,711,219 to R. A. Salathiel, sodium lignosulfonate, ammonium lignosulfonate, and the like.

The present invention is of considerable importance and utility in many operations conducted in a well in which cement is employed.

The nature and objects of the present invention having been completely described and illustrated, what we wish to claim as new and useful and secure by Letters Patent is:

1. A water-resistant composition which comprises a dry mixture of hydratable cement, a liquid hydrocarbon having a viscosity from about 1.5 to about 400 centipoises at 60° F. and boiling in the range from about 100° to about 800° F. in an amount from about 0.1% to about 10% by weight based on the cement and from about 0.01% to about 10% by weight based on the cement of a salt having a HLB in the range from about 0 to about 8 which causes preferential wetting of said cement with said liquid hydrocarbon.

2. A composition in accordance with claim 1 in which the cement is Portland cement.

3. A composition in accordance with claim 1 in which the cement is pozzolana and lime mixture.

4. A composition in accordance with claim 1 in which the cement is sand lime mixture.

5. A composition in accordance with claim 1 in which the cement is plaster of Paris.

6. A method of cementing wells which comprises forming a water-resistant composition comprising a dry mixture of hydratable cement, a liquid hydrocarbon having a viscosity from about 1.5 to about 400 centipoises at 60° F. and boiling in the range from about 100° to about 800° F. in an amount from about 0.1 to about 10% by weight based on the cement and from about 0.01% to about 10% by weight, based on the cement, of a salt having a HLB in the range from about 0 to about 8 which causes preferential wetting of said cement with said liquid hydrocarbon, introducing said composition into a well in a gasiform fluid, and there contacting said composition with an aqueous solution of a salt having a HLB in the range from about 13 to about 40 which causes wetting of said cement with said solution whereby said cement is caused to set in said well.

7. A method in accordance with claim 6 in which the cement is Portland cement.

8. A method in accordance with claim 6 in which the cement is pozzolana and lime mixture.

9. A method in accordance with claim 6 in which the cement is sand and lime mixture.

10. A method in accordance with claim 6 in which the cement is plaster of Paris.

References Cited in the file of this patent
UNITED STATES PATENTS

| | | |
|---|---|---|
| 2,776,713 | Morgan et al. | Jan. 8, 1957 |
| 2,782,857 | Clark et al. | Feb. 26, 1957 |
| 2,801,931 | Morgan et al. | Aug. 6, 1957 |